(12) United States Patent
Yuan et al.

(10) Patent No.: US 8,571,271 B2
(45) Date of Patent: Oct. 29, 2013

(54) DUAL-PHASE RED EYE CORRECTION

(75) Inventors: Lu Yuan, Beijing (CN); Fang Wen, Beijing (CN); Jian Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 13/116,254

(22) Filed: May 26, 2011

(65) Prior Publication Data

US 2012/0301024 A1  Nov. 29, 2012

(51) Int. Cl.
*G06K 9/00* (2006.01)

(52) U.S. Cl.
USPC .......... 382/117; 382/115; 382/118; 382/190; 382/270; 382/271; 382/272; 382/273; 382/274; 382/275

(58) Field of Classification Search
USPC .......... 382/115, 117–118, 103, 190, 270–275
See application file for complete search history.

(56) References Cited

U.S. PATENT DOCUMENTS

| | | | |
|---|---|---|---|
| 6,009,209 A | 12/1999 | Acker et al. | |
| 6,016,354 A | 1/2000 | Lin et al. | |
| 6,252,976 B1 | 6/2001 | Schildkraut et al. | |
| 6,278,491 B1 | 8/2001 | Wang et al. | |
| 6,292,574 B1 | 9/2001 | Schildkraut et al. | |
| 6,671,391 B1 | 12/2003 | Zhang et al. | |
| 6,873,743 B2 | 3/2005 | Steinberg | |
| 6,885,766 B2 | 4/2005 | Held et al. | |
| 6,980,691 B2 * | 12/2005 | Nesterov et al. | 382/165 |
| 7,027,662 B2 | 4/2006 | Baron | |
| 7,116,820 B2 | 10/2006 | Luo et al. | |
| 7,343,028 B2 | 3/2008 | Ioffe et al. | |
| 7,376,270 B2 * | 5/2008 | Chen et al. | 382/167 |
| 7,764,846 B2 * | 7/2010 | Marchesotti et al. | 382/274 |
| 7,835,572 B2 | 11/2010 | Ferman | |
| 7,916,190 B1 | 3/2011 | DeLuca | |
| 2002/0136450 A1 | 9/2002 | Chen et al. | |
| 2002/0176623 A1 | 11/2002 | Steinberg | |
| 2003/0053663 A1 | 3/2003 | Chen et al. | |
| 2003/0068084 A1 * | 4/2003 | Kinjo et al. | 382/164 |
| 2003/0108244 A1 | 6/2003 | Li et al. | |
| 2003/0202105 A1 | 10/2003 | Gaubatz et al. | |
| 2004/0041924 A1 | 3/2004 | White et al. | |
| 2005/0129287 A1 * | 6/2005 | Enomoto | 382/117 |
| 2005/0226499 A1 | 10/2005 | Terakawa | |
| 2005/0232490 A1 | 10/2005 | Itagaki et al. | |

(Continued)

OTHER PUBLICATIONS

Probabistic automatic red eye—correction., Willamowski et al., IEEE, 0-7695-2521, 2006, pp. 1-4.*

(Continued)

*Primary Examiner* — Jayesh A Patel
(74) *Attorney, Agent, or Firm* — Lee & Hayes, PLLC

(57) ABSTRACT

A dual-phase approach to red eye correction may prevent overly aggressive or overly conservative red eye reduction. The dual-phase approach may include detecting an eye portion in a digital image. Once the eye portion is detected, the dual-phase approach may include the performance of a strong red eye correction for the eye portion when the eye portion includes a strong red eye. Otherwise, the dual-phase approach may include the performance of a weak red eye correction for the eye portion when the eye portion includes a weak red eye. The weak red eye may be distinguished from the strong red eye based a redness threshold that shows the weak red eye as having less redness hue than the strong red eye.

19 Claims, 8 Drawing Sheets

(56) References Cited

U.S. PATENT DOCUMENTS

| | | | |
|---|---|---|---|
| 2005/0248664 | A1 | 11/2005 | Enge |
| 2006/0056687 | A1 | 3/2006 | Brandt |
| 2006/0072815 | A1 | 4/2006 | Wu et al. |
| 2006/0093238 | A1 | 5/2006 | Steinberg et al. |
| 2006/0114520 | A1 | 6/2006 | Enomoto et al. |
| 2006/0257026 | A1* | 11/2006 | Shiffer et al. ............ 382/190 |
| 2006/0274950 | A1 | 12/2006 | Fan et al. |
| 2007/0263928 | A1 | 11/2007 | Akahori |
| 2008/0137944 | A1 | 6/2008 | Marchesotti et al. |
| 2008/0170778 | A1 | 7/2008 | Luo |
| 2008/0199073 | A1 | 8/2008 | Demandolx |
| 2008/0219518 | A1 | 9/2008 | Steinberg et al. |
| 2010/0278452 | A1 | 11/2010 | Sarkijarvi et al. |
| 2011/0081079 | A1 | 4/2011 | Wang et al. |
| 2011/0115949 | A1 | 5/2011 | Corcoran et al. |

OTHER PUBLICATIONS

Red-Eye detection—photographs, Yoo et al., IEEE, 00983063, 2009, pp. 1006-1014.*

Probabistic automatic red eye—correction., Willamowski et al., IEEE, 0-7695-2521,2006, pp. 1-4.*

Red-Eye detection—photographs, Yoo et al., IEEE, 00983063, 2009, pp. 1006-1014.*

Apple website at <<http://apple.com/iphoto>>, "iPhoto 2—Picture your digial lifestyle", printed Mar. 4, 2003, 3 pages.

Apple website at <<http://apple.com/iphoto/edit.html>>, "Fine tune your photos", printed Mar. 4, 2003, 2 pages.

Gaubatz, et al., "Automatic Red-Eye Detection and Correction", Proceedings of the IEEE 2002 International Conference on Image Processing (ICIP), Sep. 2002, 4 pages.

Mathew et al., "Automatic Red-Eye Detection and Correction", IEEE ICIP 2002, vol. 1, Sep. 2002, pp. 804-807.

MSN website at <<http://photos.msn/editorial/EditorialStar.aspx?article=CDProductSubHome_Product_...>>, "MSN Photos—More Useful Everyday—Microsoft Picture It! CD Products Product Information and Picture It! Photo", printed Mar. 4, 2003, 4 pages.

MSN website at <<http://photos.msn/editorial/editorialStart.aspx?article=CDProductHome&section=CD_P...>>, "MSN Photos—More Useful Everyday—Microsoft Picture It! CD Products", printed Mar. 4, 2003, 2 pages.

Viola, et al., "Robust Real-time Object Detection", Compaq Computer Corporation—Cambridge Research Laboratory, technical Research Series, CRL Jan. 2001, Feb. 2001, 28 pages.

Volken, et al., "Automatice Red-Eye Removal based on Sclera and Skin Tone Detection", Proceedings of the 2006 International Conference on Computer Graphics, Imaging and Visualization (CGIV'06), Jul. 2006, 6 pages.

Williamowski, et al., "Probabilistic Automatic Red Eye Detection and Corrections", IEEE 18th International Conference on Pattern Recognition (ICPR'06), Aug. 2006, 4 pages.

Yoo, et al., "Red-Eye Detection and Correction Using Inpainting in Digital Photographs", IEEE Transactions on Consumer Electronics, vol. 55, No. 3, Aug. 2009, pp. 1006-1014.

The PCT Search Report mailed Nov. 16, 2012 for PCT application No. PCT/US2012/038737, 12 pages.

* cited by examiner

DUAL-PHASE RED EYE CORRECTION

BACKGROUND

An appearance of red eyes is a well known problem in photographs that feature faces of people or animals. The widespread use of cameras with built-in flashes produces many photographs that are affected by this problem. Software tools for the digital removal of red eye artifacts from photographs have become prevalent features in many image processing and photo editing applications. Some semi-automatic or manual software tools rely on the user to either select the red eyes in a digital image or draw a box that surrounds the red eyes before performing red eye corrections. Other software tools may automatically perform such red eye corrections without user input.

SUMMARY

Described herein are techniques for implementing a dual-phase red eye correction tool. The dual phase red eye correction tool may initially classify one or more detected red eyes in a digital image into a strong red eye category or a weak red eye category, in which strong and weak refer to the intensity of the redness in the eyes present in the digital image. Once a red eye that is present in the digital image has been classified into the strong red eye category or the weak red eye category, the red eye in the digital image may be further corrected with the application of a soft mask and a redness correction algorithm that is specific to the particular red eye category. In this way, the dual-phase red eye correction tool may prevent overly aggressive red eye reduction that may distort the appearance of the eye in the digital image and overly conservative red eye reduction that fails to effectively remove the red appearance of the eye in the digital image.

In at least one embodiment, the dual-phase approach to red eye detection may include detecting an eye portion in a digital image. Once the eye portion is detected, the dual-phase approach may include the performance of a strong red eye correction for the eye portion when the eye portion includes a strong red eye. Otherwise, the dual-phase approach may include the performance of a weak red eye correction for the eye portion when the eye portion includes a weak red eye. The weak red eye may be distinguished from the strong red eye based a redness threshold that shows the weak red eye as having less redness hue than the strong red eye.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The embodiments described herein pertain to techniques for implementing a dual-phase red eye correction tool. The dual-phase red eye correction tool may initially classify one or more detected red eyes in a digital image into a strong red eye category or a weak red eye category, in which the strong and weak refers to the intensity of the redness in the eyes present in the digital image. Once the red eyes present in the digital image has been classified into the strong red eye category or the weak red eye category, the red eye in the digital image may be corrected using a red eye correction component of the correction tool that is specific to the particular red eye category.

The dual-phase approach to red eye correction may prevent overly aggressive red eye reduction that distort the appearance of the eyes in the digital image and overly conservative red eye reduction that fails to effective remove the red appearance of the eyes in the digital image. Various examples of techniques for performing the dual phase to red eye correction in accordance with the embodiments are described below with reference to FIGS. 1-8.

Example Scheme

Figure 1:
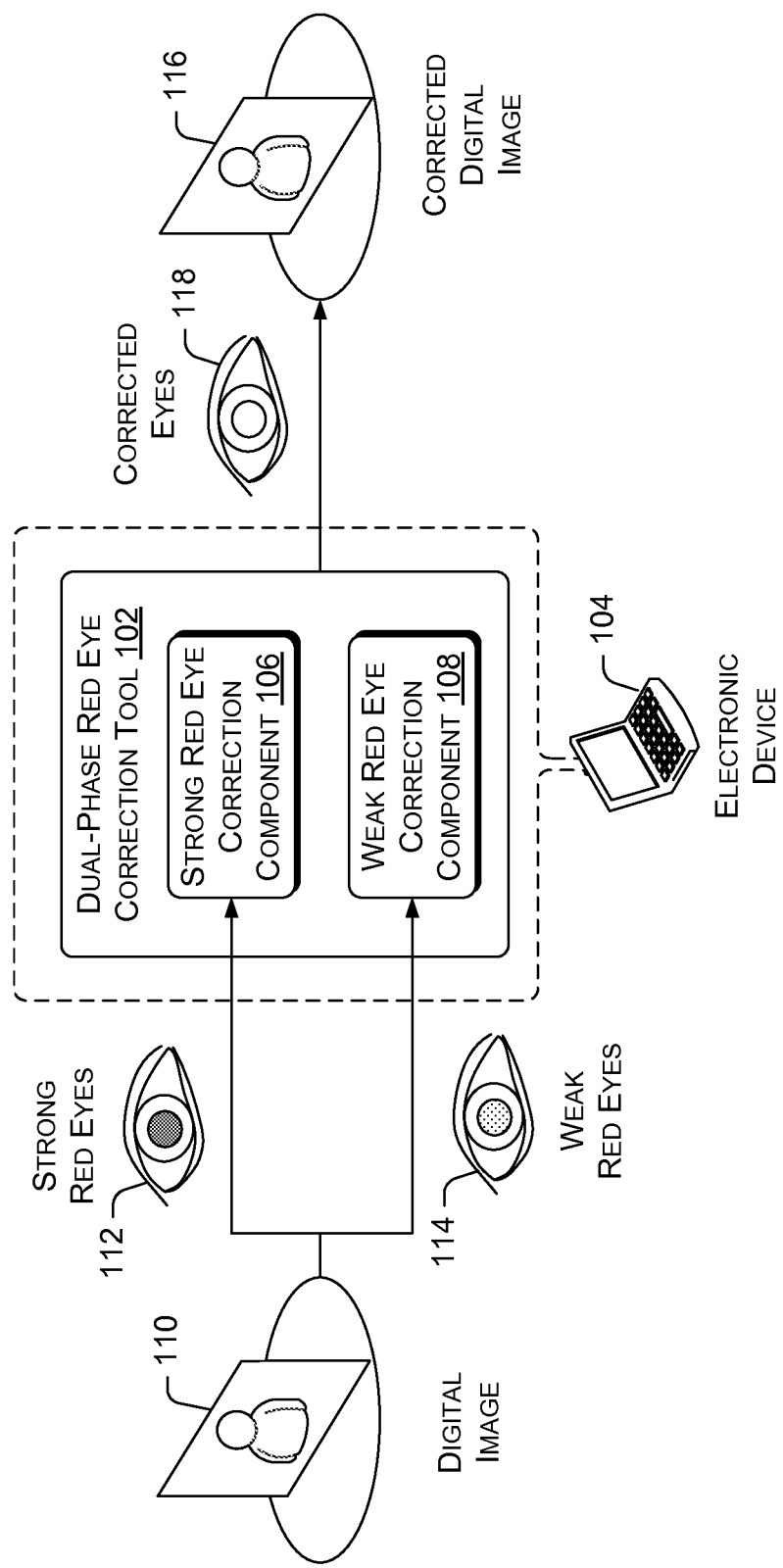
FIG. 1 is a block diagram that illustrates an example scheme that implements a dual-phase red eye correction tool.

FIG. 1 is a block diagram that illustrates an example scheme 100 that implements a dual-phase red eye correction tool 102. The dual-phase red eye correction tool 102 may be implemented by an electronic device 104. The dual-phase red eye correction tool 102 may include a strong red eye correction component 106 and a weak red eye correction component 108. The dual-phase red eye correction tool 102 may initially detect one or more potential red eyes that are in a digital image 110. Subsequently, the tool 102 may classify the potential red eyes as strong red eyes 112 or weak red eyes 114 based on the hue information related to the redness of the red eyes. For example, as further described below, the red eyes may be classified into a strong red eye category when the intensity of the red hue that appears in the red eyes exceeds a particular intensity threshold. In contrast, the red eyes may be classified into a weak red eye category when the intensity of the red hue is less than or equal to the particular intensity threshold. Thus, depending on the particular category that the red eyes are classified into, the red eyes may be corrected by the strong red eye correction component 106 or the weak red eye correction component 108. The red eye correction may produce a corrected digital image 116 that shows corrected eyes 118.

In various embodiments, potential red eyes in a digital image 110 may be first processed by the strong red eye correction component 106. If the potential red eyes are validated to be strong red eyes, then the strong red eye correction component 106 may perform the appropriate correction.

However, if the potential red eyes are not strong red eyes, the strong red eye correction component 106 may pass the digital image 110 to the weak red eye correction component 108 for processing. The weak red eye correction component 108 may determine whether the potential red eyes are weak red eyes or in fact not red eyes. Thus, if the potential red eyes are validated to be weak red eyes, then the weak red eye correction component 108 may perform the appropriate correction. However, if the weak red eye correction component 108 determines that there are in fact no red eyes present in the digital image 110, then no correction is performed by the weak red eye correction component 108.

Accordingly, the alternative use of the strong red eye correction component 106 or the weak red eye correction component 108 of the dual-phase red eye correction tool 102 may prevent overly aggressive or overly conservative red eye reduction.

Example Electronic Device Components

Figure 2:
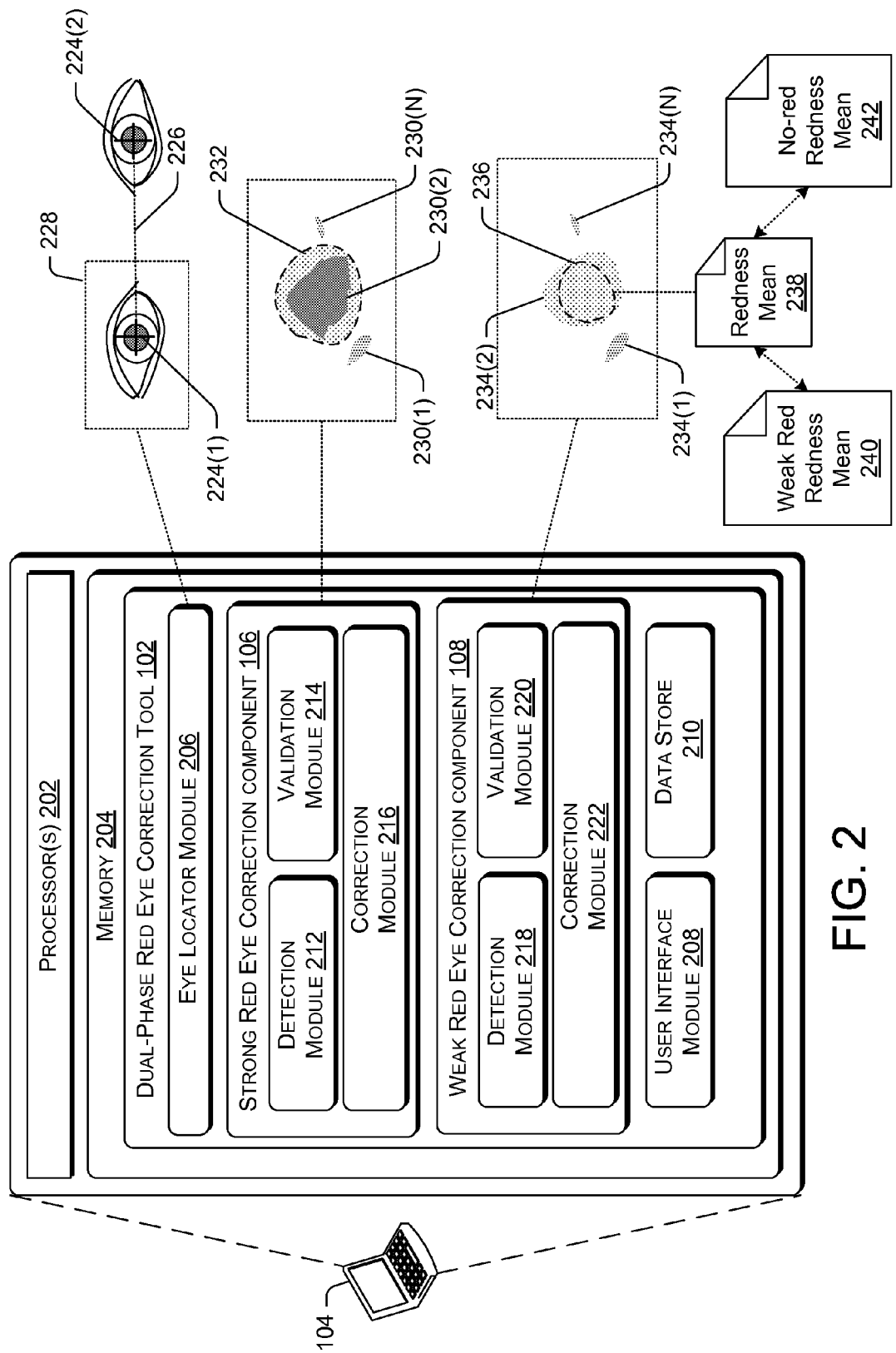
FIG. 2 is a block diagram that illustrates selected illustrative components of an electronic device that implements a dual-phase red eye correction tool.

FIG. 2 is a block diagram that illustrates selected components of an electronic device that implements the dual-phase red eye correction tool. In various embodiments, the electronic device 104 may be a general purpose computer, such as a desktop computer, a tablet computer, a laptop computer, a server, and so forth. However, in other embodiments, the electronic device 104 may be one of a camera, a smart phone, a game console, a personal digital assistant (PDA), and so forth.

The electronic device 104 may includes one or more processors 202, memory 204, and/or user controls that enable a user to interact with the electronic device. The memory 204 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The electronic device 104 may have network capabilities. For example, the electronic device 104 may exchange data with other electronic devices (e.g., laptops computers, servers, etc.) via one or more networks, such as the Internet. In some embodiments, the electronic device 104 may be substituted with a plurality of networked servers, such as servers in a cloud computing network.

The one or more processors 202 and the memory 204 of the electronic device 104 may implement an eye locator module 206, the strong red eye correction component 106, the weak red eye correction component 108, a user interface module 208, and a data store 210. In turn, the strong red eye correction component 106 may include a detection module 212, a validation module 214, and a correction module 216. Likewise, the weak red eye correction component 108 may include a detection module 218, a validation module 220, and a correction module 222. The modules may include routines, programs instructions, objects, and/or data structures that perform particular tasks or implement particular abstract data types.

The eye locator module 206 may automatically locate eye portions in a digital image, such as the digital image 110. In at least one embodiment, the eye locator module 206 may use a cascade face detector, which includes a sequence of node classifiers, to find a face region in the digital image 110. The eye locator module 206 may then use a neural network technique to locate an eye portion, such as the detected eye portion, in the face region. However, in additional embodiments, the eye locator module 206 may use other object recognition techniques to locate the face region and the eye portions in the digital image 110. These techniques may include various classification schemes (explicitly and/or implicitly trained) and/or machines (e.g., support vector machines, neural networks, expert systems, Bayesian belief networks, fuzzy logic, data fusion engine, and/or the like).

Alternatively the eye locator module 206 may locate eye portions in the digital image 110 according to manual input from a user. In various embodiments, the eye locator module 206 may provide user interface controls via the user interface module 208. The user interface controls may enable a user to digitally mark (e.g., click) a pair of eye pupil centers (i.e., the left eye pupil center and the right eye pupil center) that are present in the digital image 110 with digital markers (e.g., markers 224(1) and 224(2)). Subsequently, the eye locator module 206 may use the marking information to find the eye portions in the digital image 110. For example, the eye locator module 206 may use the distance between the marks provided by the user, which is the interpupillary distance (e.g., interpuillary distance 226), to estimate the eye portions that surround the eye pupil centers. In various embodiments, a located eye portion in the digital image 110, such as the detected eye portion 228, may be a box-shaped (e.g., rectangular) portion that encompasses an eye that has been located.

The strong red eye correction component 106 may be the first component to process eye portions detected by eye locator module 206. The detection module 212 of the strong red eye correction component 106 may detect the presence of a red eye in each eye portion. The detection module 212 may initially generate a redness probability map for each eye portion. The redness probability map may indicate for each pixel that makes up the eye portion, whether the pixel is part of a red eye area, i.e., pupil, of an eye, or simply a part of background in the eye portion (e.g., iris, white part of the eye, skin, etc.) In some embodiments, the detection module 212 may develop the probability map by calculating a relative redness probability for each pixel that takes in account factors such a measurement of redness for the pixel, the luminance of the pixel, the local color contrast and/or luminance contrast between the pixel and multiple pixels adjacent to the pixel, and so forth. The probability map may be further normalized according to maximum and minimum pixel redness probability values.

For example, the measurement of redness for a pixel may be computed based on a ratio between a measure of a red pixel energy component and a measure of total pixel energy. For example, in at least one embodiment, the redness measure of a pixel, M, may be computed as follows:

$$M = \frac{\alpha \cdot r + \beta \cdot g + \gamma \cdot b}{r + g + b + d} \qquad (1)$$

In which r, g, and b are red, green, and blue component pixel values in the RGB color space, respectively, $\alpha$, $\beta$, $\gamma$ are the weight factors, and d is a prescribed constant with a value selected to avoid singularities and to give higher weights to brighter pixels. In one instance, each of r, g, and b may have a value in the range of [0, 255], and a may have a value of 204, $\beta$ may have a value of −153, and $\gamma$ may have a value of 51, and d may have a value of 1. Nevertheless, in other embodiments, the measurement of redness for a pixel may be computed using one or more additional techniques.

Following the generation of a probability map for an eye portion, the detection module 212 may use a threshold-based segmentation to generate a binary mask that locates one or more candidate red eye areas in the eye portion. For example, the detection module 212 may deem a pixel in the eye portion that has a redness probability that meets or exceeds a probability threshold value (e.g., 0.85) as a part of a candidate red eye area. Conversely, the detection module 212 may deem a pixel in the eye portion with a redness probability that is below the probability threshold as a part of the background.

Thus, the detection module 212 may further label each pixel in the eye portion in a binary manner depending on whether the pixel is a part of the red eye area or a part of the background. For example, a red eye area pixel may be labeled with a binary value of "1", while a background pixel may be labeled with a binary value of "0". In this example, the detection module 212 may construct a binary mask that encompasses the one or more candidate red eye areas by discarding pixels that are labeled with "0".

The validation module 214 may validate that a selected candidate red eye area in the eye portion is a strong red eye area. In order to do so, the validation module 214 may initially select a candidate red eye area as a maximum region $\Omega_{max}$. In many instances, the use of the redness probability map and the threshold-based segmentation by the detection module 212 may result in the discovery of one or more candidate red eye areas (e.g., candidate red eye areas 230(1)-230(N)) in the eye portion. Thus, the validation module 214 may select a candidate red eye area (e.g., 230(2)) that has the largest area and is closest to a center of the detected eye portion as the maximum region $\Omega_{max}$.

Once the maximum region $\Omega_{max}$ is selected, the validation module 214 may evaluate the maximum region $\Omega_{max}$ on several aspects to perform the strong red eye area validation. These aspects may include (1) roundness of the region; (2) centrality of the region; and (3) hue of the region. The roundness of the maximum region $\Omega_{max}$ plays a role in the determination of a strong red eye area because the more round the maximum region $\Omega_{max}$, the more likely the maximum region $\Omega_{max}$ is part of an eye, rather than some other part of a face. Likewise, the more centrally located the maximum region $\Omega_{max}$ in a detected eye portion, the more likely that the candidate red eye area that encompasses the maximum region $\Omega_{max}$ is part of an eye. Further, the validation module 214 may use the hue of the maximum region $\Omega_{max}$ to determine whether the candidate red eye area is a strong red eye area or a weak red eye area. The validation of the roundness and centrality aspects of a maximum region $\Omega_{max}$ is further illustrated in FIG. 3.

Figure 3:
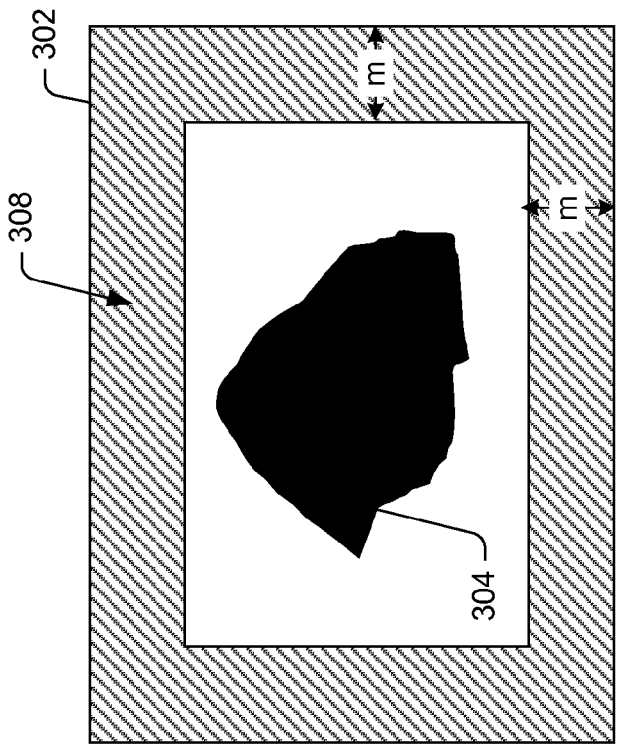
FIG. 3 illustrates the validation of the roundness and centrality of a region as part of an overall validation that an eye portion includes a strong red eye area, in accordance with various embodiments.
Figure 3:
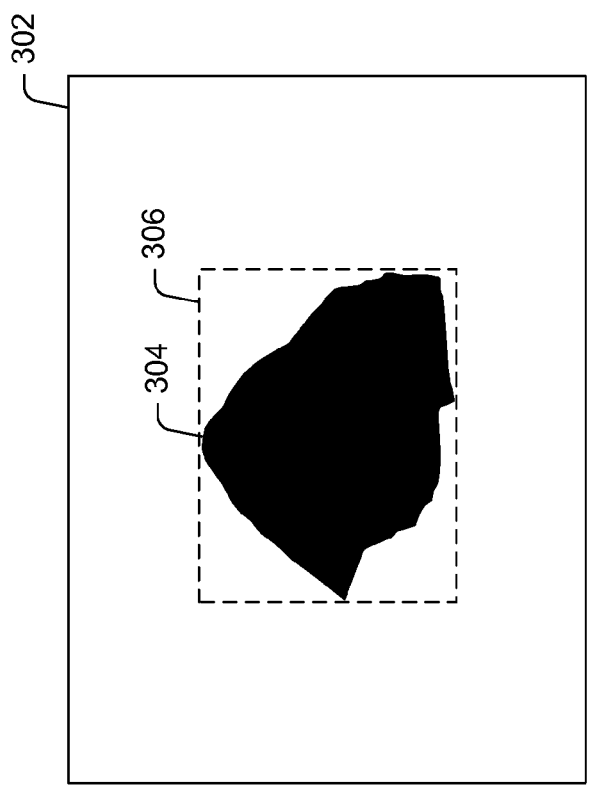

FIG. 3 illustrates the validation of the roundness and centrality of a maximum region $\Omega_{max}$ as part of an overall validation that the candidate red eye area is a strong red eye area. As shown, the validation of the roundness of a maximum region $\Omega_{max}$ may be illustrated for a detected eye portion 302 (shown in the left portion of FIG. 3). The detected eye portion 302 may include a maximum region $\Omega_{max}$ 304 that is a candidate red eye area selected from a binary mask.

In order to determine the roundness of the maximum region $\Omega_{max}$, the validation module 214 may initially calculate and place a bounding box 306 around the maximum region $\Omega_{max}$ 304. Subsequently, the validation module 214 may calculate four variables: (1) the ratio ($R_1$) of the maximum region $\Omega_{max}$ 304 to the bounding box 306; (2) the ratio ($R_2$) of an minimal side of the bounding box 306 to the minimal side of the detected eye portion 302; (3) the ratio ($R_3$) of the maximum region $\Omega_{max}$ 304 to the detected eye portion 302; and (4) the ratio ($R_4$) of a minimal side of the bounding box 306 to a maximal side of the bounding box 306. The validation module 214 may then further determine that the roundness of the maximum region $\Omega_{max}$ indicates that it is indeed part of an eye when each of $R_1$, $R_2$, $R_3$, and $R_4$ meets certain corresponding predefined threshold values. For example, in at least one embodiment, the validation module 214 may determine that the maximum region $\Omega_{max}$ 304 has the proper roundness to be deemed part of an eye when $R_1$>0.6, $R_2$>0.2, $R_3$<0.25, and $R_4$<0.45. However, such threshold values may be determined empirically, and other suitable threshold values for $R_1$, $R_2$, $R_3$, and $R_4$ may be used in other embodiments. Otherwise, the validation module 214 may determine that the maximum region $\Omega_{max}$ 304 does not have the proper roundness, and thus is not part of an eye.

The validation of the centrality of a maximum region $\Omega_{max}$ in a detected eye portion may be illustrated with respect to the same detected eye portion 302 (shown in the right portion of FIG. 3). In various embodiments, the validation module 214 may initially shrink the size of the detected eye portion 302 by a predefined number of pixels to form a boundary region 308. For example, the predefined number of pixels, m, may be m=5 in at least one embodiment, although a different number of predefined pixels may be used in other embodiments. The validation module 214 may then calculate the number of pixels belonging to the maximum region $\Omega_{max}$ that are present in the boundary region 308, which is denoted as $N_1$. The validation module 214 may also calculate the number of pixels that are in the maximum region $\Omega_{max}$ 304, which is denoted as $N_2$. Subsequently, the validation module 214 may calculate a ratio R based on $N_1$ and $N_2$. In at least one embodiment, the ratio R may be calculated as follows:

$$R = \frac{N_1}{\sqrt{4*\pi*N_2}} \tag{2}$$

In such embodiments, the validation module 214 may determined that the maximum region $\Omega_{max}$ 304 is centrally located, and that it is part of an eye when the value of the ratio R meets a predefined threshold. For example, in at least one embodiment, the validation module 214 may determine that the maximum region $\Omega_{max}$ is centrally located when R<0.2. Otherwise, the validation module 214 may determine that the maximum region $\Omega_{max}$ 304 is not centrally located. However, since the predefined threshold for the ratio R may be determined empirically, other suitable threshold values for R may be implemented in other embodiments.

Returning to FIG. 2, the validation module 214 may use the hue information of a maximum region $\Omega_{max}$ (e.g., maximum region $\Omega_{max}$ 304), to determine whether the maximum region $\Omega_{max}$ is a strong red eye area or a weak red eye area. The validation module 214 may make this determination by deriving two different thresholds of redness, $T_1$ and $T_2$, from the hue of the maximum region $\Omega_{max}$, and then compare $T_1$ and/or $T_2$ to predefined threshold values. The validation module 214 may derive the first threshold $T_1$ from the measures of redness for the pixels in the maximum region $\Omega_{max}$. For example, in at least one embodiment, the first threshold $T_1$ may be the mean of the redness measures of the pixels in the maximum region $\Omega_{max}$ as expressed in the RGB color space. The validation module 214 may derive the second threshold $T_2$ by calculating the mean color value of the detected eye portion (e.g., the detected eye portion 302). The validation module 214 may then transform the red, green, and blue (RGB) color space colors of the detected eye portion into Lab color space colors. Subsequently, the validation module 214 may calculate the threshold $T_2$ as follows:

$$T_2=8*R-9*L*L-0.18 \tag{3}$$

In which R is the R channel mean value of the RGB color space colors and L is the luminance channel mean value of the Lab color space colors, and in which both R and L are normalized to [0, 1]. Accordingly, the validation module 214 may determine that the candidate red eye area is strong red eye area when one or more of R, $T_1$, and $T_2$ meet certain predefined threshold values. For example, in at least one embodiment, the validation module 214 may determine that the candidate red eye area, i.e., the maximum region $\Omega_{max}$, is a strong red eye area when $T_1>0.9$ or when $T_1>0.75$, $T_2>0$, $R>0.3$. Otherwise, the validation module 214 may determine that the red eye area is not a strong red eye area. Further, since the predefined threshold values for R, and $T_2$ may be determined empirically, other suitable threshold values for R, $T_1$, and $T_2$ may be implemented in other embodiments.

Accordingly, the validation module 214 may determine that a candidate red eye area is a strong red eye area when the maximum region $\Omega_{max}$ has the adequate roundness, is sufficiently centrally located in the corresponding detected eye portion, and has hue information that matches the profile for a strong red eye. Otherwise, as further described below, if at least one of these aspects is not met, the validation module 214 may cause the weak red eye correction component 108 to process the detected eye portion.

Once a candidate red eye area, i.e., maximum region $\Omega_{max}$, is determined to be a strong red eye area by the validation module 214, the correction module 216 may correct the red appearance of the strong red eye area. In various embodiments, the correction module 216 may extract a soft mask of a correction region (e.g., correction region 232) that encompasses the strong red eye area for correction. The correction region may differ from the maximum region $\Omega_{max}$ in that the maximum region $\Omega_{max}$ is selected to ignore the surrounding weak-red pixels.

Accordingly, to include such weak-red pixels, the correction module 216 may select a larger strong red eye area by using A<0.5 as a redness value, in which A is the mean value of the "a" color-opponent dimension in the Lab color space colors for the eye portion, and A may be different values in other embodiments. For the pixels of the larger strong red eye area that is selected by the redness value A, the correction module 216 may perform a segmentation using a redness threshold to locate another maximum region $\Omega'_{max}$ at the center of the larger strong red eye area. In at least some embodiments, the redness threshold may be expressed as: $\sqrt{(2.5*\text{variance})}+\text{mean}$, in which variance is the variance of the redness measures of the pixels in the larger strong red eye area that are included by the redness value, and mean is the mean of the redness measures of the pixels in the larger strong red eye area that are include by the redness value. However, other redness threshold values may be used in other embodiments as long as a segmentation of the larger strong red eye area is achieved.

The correction module 216 may obtain the soft mask of the correction region by initially combining the maximum regions $\Omega_{max}$ and $\Omega'_{max}$. Following the combination, the correction module 216 may implement an edge preserving filter (e.g., a joint-bilateral filter or a guided filter) to obtain a confidence map $C_{strong}$ from the soft mask, which is then weighted by a distance from the correction region to a center of the eye portion. Subsequently, in at least one embodiment, the correction module 216 may correct each pixel in the correction region using the algorithm:

$$R'=(1-C_{strong})*R+C_{strong}*\min(G, B) \tag{4}$$

$$I'=(1-0.8*C_{strong})*I+0.8*C_{strong}*\min(G, B) \tag{5}$$

in which I={G, B} and R, G, and B are the three color channels in the RGB color space. However, in other embodiments, the correction module 216 may use a similar algorithm with different values as long as the desired correction of the redness in each pixel of the correction region is achieved.

The weak red eye correction component 108 may process an eye portion (e.g., eye portion 228) having a candidate red eye area that has been rejected by the strong red eye correction component 106 as being a strong red eye area. In order to process the eye portion, the detection module 218 of the weak red eye correction component 108 may initially determine one or more potential weak red eye areas in the eye portion. In various embodiments, the detection module 218 may obtain a first measure of the redness for each pixel in the eye portion by:

$$C_1=(1-\max(R, G, B))*(1-R) \tag{6}$$

in which R, G, B are the three color channels in the RGB color space.

Based on this measure of redness for each pixel, the detection module 218 may use a threshold-based segmentation to separate one or more potential weak red eye areas (e.g., potential weak red eye areas 234(1)-234(N)) of the eye portion from a background area of the eye portion. For example, the detection module 212 may deem a pixel in the eye portion that has a redness measurement that meets or exceeds a redness threshold as part of a potential weak red eye area. Conversely, the detection module 212 may deem a pixel in the eye portion with redness measurement that is below redness threshold as a part of the background.

Once the detection module 218 has obtained the one or more potential weak red eye area, the detection module 218 may further select a maximum region $\Omega_{max}$ from the red eye area. In various embodiments, the validation module 214 may select a potential weak red eye area that has the largest area and is closest to the center of the detected eye portion as the maximum region $Q_{max}$. The detection module 218 may then estimate a central point $(p_x, p_y)$, and a radius r for the maximum region $_{\Omega max}$.

Additionally, the detection module 218 may further obtain a second measure of redness for each pixel in the eye portion in the YCrCb color space by:

$$C_2=(1-Y)*Cb \tag{7}$$

Based on these two redness measurements for each pixel, the validation module 220 may use a classifier to determine whether the eye portion contains an actual weak red eye area or non-red eye area. In order to use the classifier, the validation module 220 may first estimate a confidence map for the pixels in the eye portion by multiplying the redness measure $C_2$ of each pixel by a distance map expression:

$$\exp\left(\frac{-((x-p_x)^2 + (y-p_y)^2)}{\sigma^2}\right).$$

Subsequently, the validation module 220 may extract a possible weak red eye region from the selected potential weak red eye area based on a set of empirical constraints. The set of empirical constraints may include (1) the possible weak red eye region is to lie in the maximum region $\Omega_{max}$; (2) the distance from the possible weak red eye region to the central point $(p_x, p_y)$ is not to exceed the radius r; and (3) R/(R+G+B)>0.4 and (R+G+B)>0.2, in which R, G, and B are the three color channels in the RGB color space for the possible weak red eye region.

When the validation module 220 has obtained a possible weak red eye region, the validation module may calculate a mean of redness, $\mu_{red}$, such as mean of redness 238, for the portion of the confidence map that correlates to the possible weak red eye region. Based on this mean of redness, $\mu_{red}$, the validation module 220 may then obtain (1) a distance from $\mu_{red}$ to the mean of redness 240 for a cluster of known weak red eye regions; and (2) a distance from $\mu_{red}$ to the mean of redness 242 for a cluster of known non-red eye regions. In various embodiments, each of the clusters may be obtained beforehand in a training phase by modeling digital image training samples using a clustering algorithm (e.g., Gaussian distribution, K-means clustering, etc.).

Thus, if the distance from $\mu_{red}$ to the mean of redness for the cluster of known weak red eye regions is smaller than the distance from $\mu_{red}$ to the mean of redness for the cluster of known non-red eye region, then the validation module 220 may determine that the possible weak red eye region is indeed a weak red eye region (e.g., weak red eye region 236). Conversely, if the distance from $\mu_{red}$ to the mean of redness for the cluster of known weak red eye regions is larger than the distance from $\mu_{red}$ to the mean of redness for the cluster of known non-red eye region, then the validation module 220 may determine that the possible weak red eye region is actually not a red eye region.

Once a weak red eye region is confirmed for an eye portion, the correction module 222 of the weak red eye correction component 108 may obtain a soft mask for a weak red eye area of the eye portion that is to be corrected. In at least one embodiment, the correction module 222 may use $C_2$ to measure the redness of each pixel in the eye portion. Subsequently, the correction module 222 may perform a segmentation of the eye portion using a redness threshold to locate a maximum region $\Omega'_{max}$ within the eye portion. For example, the correction module 222 may determine that a pixel is part of the maximum region $\Omega'_{max}$ if its $C_2$ measure of redness value meets or exceeds the redness threshold. Conversely, the correction module 222 may determine that a pixel is not part of the maximum region $\Omega'_{max}$ if its $C_2$ measure of redness value is below the redness threshold.

When the maximum region $\Omega'_{max}$ is determined for the eye portion, the correction module 222 may obtain the soft mask of a preliminary area by combining the maximum regions $\Omega_{max}$ and $\Omega'_{max}$. The correction module 222 may then use an edge-preserving filter (e.g., guided filter) to obtain a confidence map of a larger weak red eye area from the soft mask, in which the confidence map is further weighted by a distance from the weak red eye area to a center of the eye portion that encompasses the weak red eye area. Subsequently, in at least one embodiment, the correction module 222 may obtain the target color T by first converting a gray color that is derived from the RGB colors of weak red eye area, i.e., (G+B)/2 to the Lab color space and then multiply the L channel of the Lab color space by a factor, e.g., a factor of 0.8. The correction module 222 may then correct the color of the weak red eye area using the confidence map, $C_{weak}$, by:

$$I' = (1 - C_{weak}) * I + C_{weak} * T \qquad (8)$$

in which I={R, G, B} and R, G, and B are the three color channels in the RGB color space. Otherwise, if the validation module 220 had determined that the possible weak red eye region is actually not a red eye region, then no correction is performed by the correction module 222.

The user interface module 208 may enable a user to interact with the various modules on the electronic device 104 using a user interface (not shown). The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

In various embodiments, the user interface module 208 may enable a user to select digital images, such as the digital image 110, to be corrected by the dual-phase red eye correction tool 102. The user interface module 208 may further enable the user to provide digital markers, such as the digital markers 224(1) and 224(2), to the strong red eye locator module 206. In turn, the dual-phase red eye correction tool 102 may use the user interface module 208 to present uncorrected digital images and corrected digital images that include corrected eyes to the user. In additional embodiments, the user interface module 208 may also enable the user to adjust the various threshold values that are used by the dual-phase red eye correction tool 102.

The data store 210 may store the uncorrected digital images and corrected digital images. In various embodiments, the uncorrected digital images and the corrected digital images may be stored in uncompressed (i.e., raw), lossless compression, or lossy compression formats. The data store 210 may further store the various threshold values and reference cluster redness mean values that are used by the components of the dual-phase red eye correction tool 102. Additionally, the data store 210 may also store other intermediate products or values that are generated or used by dual-phase red eye correction tool 102.

In some embodiments, the dual-phase red eye correction tool 102 may be an integral part of a photo editing or an online media sharing application. Such an application may enable the user to further annotate, comment, edit, distribute, or otherwise manipulate the digital images.

Example Processes

FIGS. 4-8 describe various example processes for implementing a dual-phase red eye correction tool. The order in which the operations are described in each example process is not intended to be construed as a limitation, and any number of the described operations can be combined in any order and/or in parallel to implement each process. Moreover, the operations in each of the FIGS. 4-8 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

Figure 4:
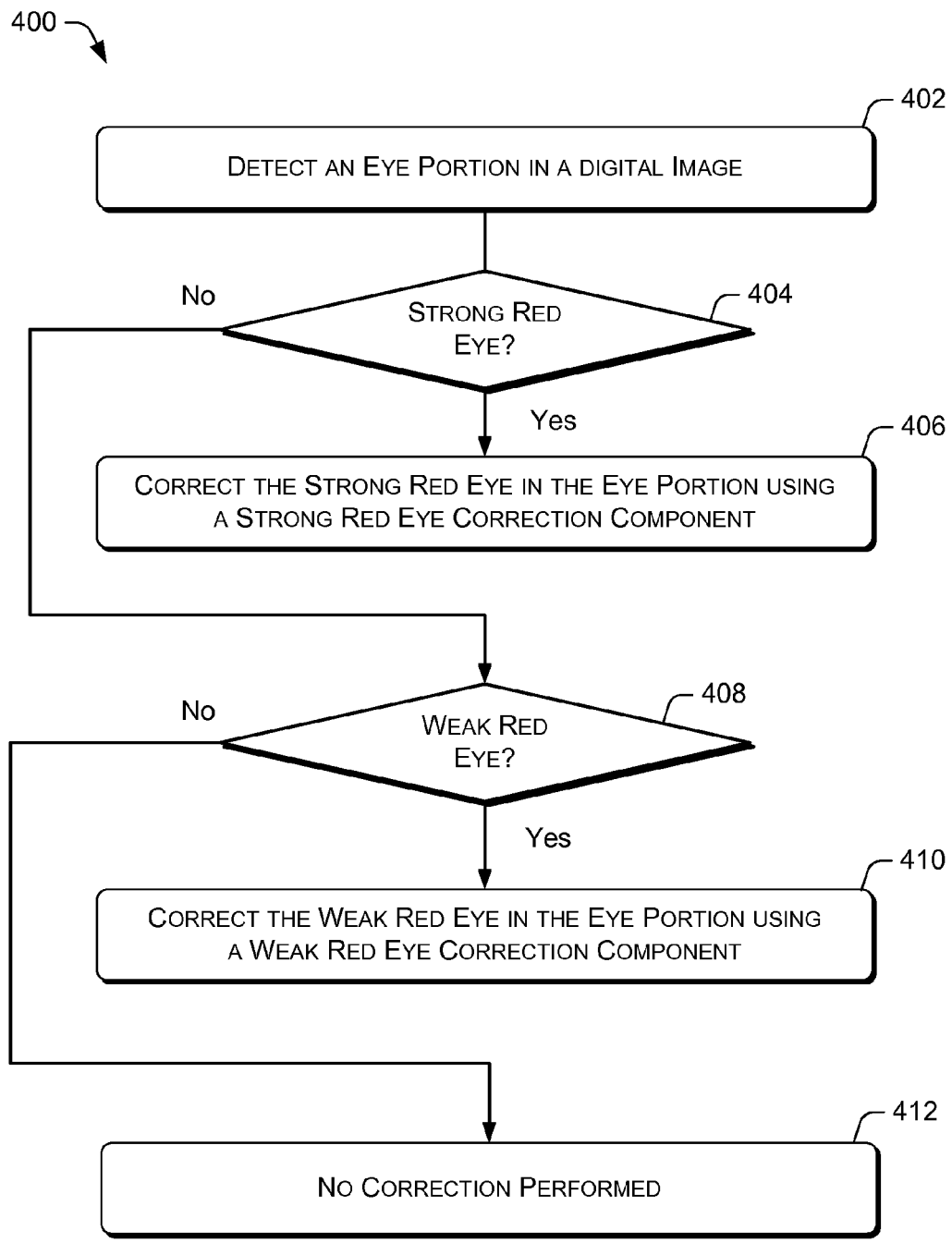
FIG. 4 is a flow diagram that illustrates an example process for implementing the dual-phase red eye correction tool.

FIG. 4 is a flow diagram that illustrates an example process 400 for implementing the dual-phase red eye correction tool 102. At 402, the eye locator module 206 may detect an eye portion (e.g., eye portion 228) in a digital image, such as the digital image 110. In various embodiments, the eye locator module 206 may automatically detect the eye portion using different object recognition techniques or according to manual input from a user. In at least one embodiment, the detected eye portion may a box-shaped (e.g., rectangular) portion that encompasses an eye that has been located.

At decision 404, the strong red eye correction component 106 may determine whether the eye portion includes a strong red eye. As further described below, the detection module 212 may initially extract a candidate red eye area that is in the eye portion. Subsequently, the validation module 214 of the strong red eye correction component 106 may make the strong red or weak red eye determination based on a shape of a candidate red eye area in the eye portion, a centrality of the candidate red eye area, and hue information of the candidate red eye area.

Thus, if the validation module 214 determines that the eye portion includes a strong red eye ("yes" at decision 404), the process 400 may proceed to 406. At 406, the correction module 216 may correct the strong red eye in the eye portion by calculating a strong red eye soft mask for the red eye and then using the strong red eye soft mask to correct the red eye. However, if the validation module 214 determines that the eye portion does not include a strong red eye ("no" at decision 404), the process 400 may proceed to decision 408.

At decision 408, the weak red eye correction component 108 may received the eye portion and determine whether the eye portion includes a weak red eye or actually does not include any red eye. As further described below, the detection module 218 of the weak red eye correction component 108 may extract a possible weak red eye region, and the validation module 220 may compare the redness mean of the possible red eye region to a redness mean of a cluster of known weak red eyes and a redness mean of a cluster of no red eyes to determine whether the eye portion includes a weak red eye.

Thus, if the validation module 220 determines that the eye portion includes a weak red eye ("yes" at decision 408), the process may proceed to 410. At 410, the correction module 222 may correct the weak red eye in the eye portion by calculating a weak red eye soft mask for the red eye and then using the weak red eye soft mask to correct the red eye.

However, if the validation module 214 determines that the eye portion does not include a weak red eye ("no" at decision 408); the process 400 may proceed to 412. At 412, the dual-phase red eye correction tool 102 may perform no correction on the eye portion in the digital image.

Figure 5:
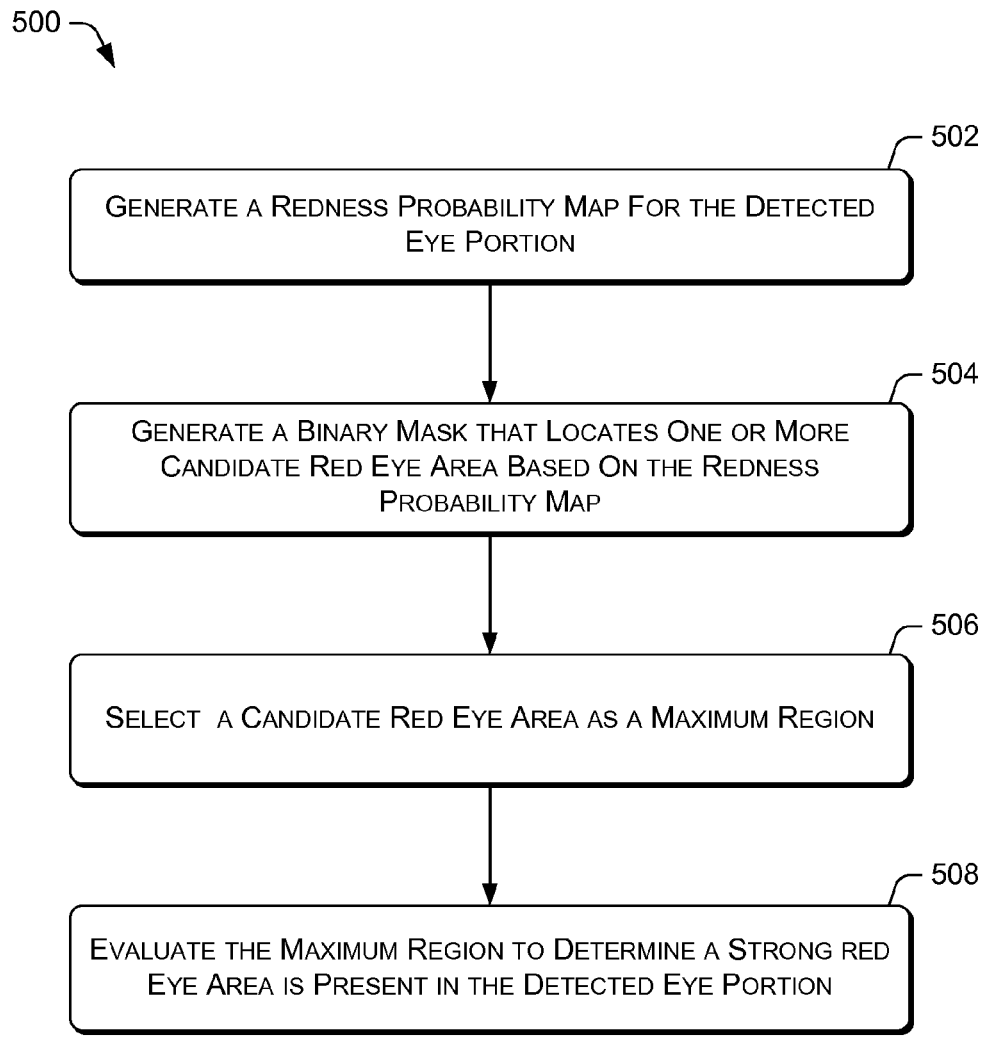
FIG. 5 is a flow diagram that illustrates an example process to determine whether an eye portion of a digital image includes a strong red eye or a weak red eye.

FIG. 5 is a flow diagram that illustrates an example process 500 to determine whether an eye portion of a digital image includes a strong red eye or a weak red eye. The example process 500 may further illustrate the decision 404 of the example process 400.

At 502, the detection module 212 may generate a redness probability map for a detected eye portion. The probability map may be generated based on a redness measure that quantifies the redness of each pixel in the eye portion.

At 504, the detection module 212 may generate a binary mask that locates one or more candidate red eye areas based on the redness probability map. In various embodiments, the binary mask may be generated using a predefined segmentation threshold value that separates the pixels in the eye portion according to their redness probabilities in the redness probability map.

At 506, the detection module 212 may further select a candidate red eye area as a strong red eye maximum region. In instances where multiple candidate red eye areas are present, the detection module 212 may select a candidate red eye area with the largest area and closest to the center of the eye portion as the strong red maximum region.

At 508, the validation module 220 may evaluate the strong red eye maximum region to determine whether a strong red eye area is present in the eye portion. In various embodiments, the validation module 222 may determine that a strong red eye area is present when the strong red eye maximum region has the appropriate roundness, the location of the strong red eye maximum region is located in a suitably centralized location in the eye portion, and the hue of the strong red eye maximum region meets one or more redness thresholds. Thus, a strong red eye correction is to be performed for the eye portion. Otherwise, if the strong red eye maximum region fails to meets any of these criteria, then no strong red eye correction is to be performed.

Figure 6:
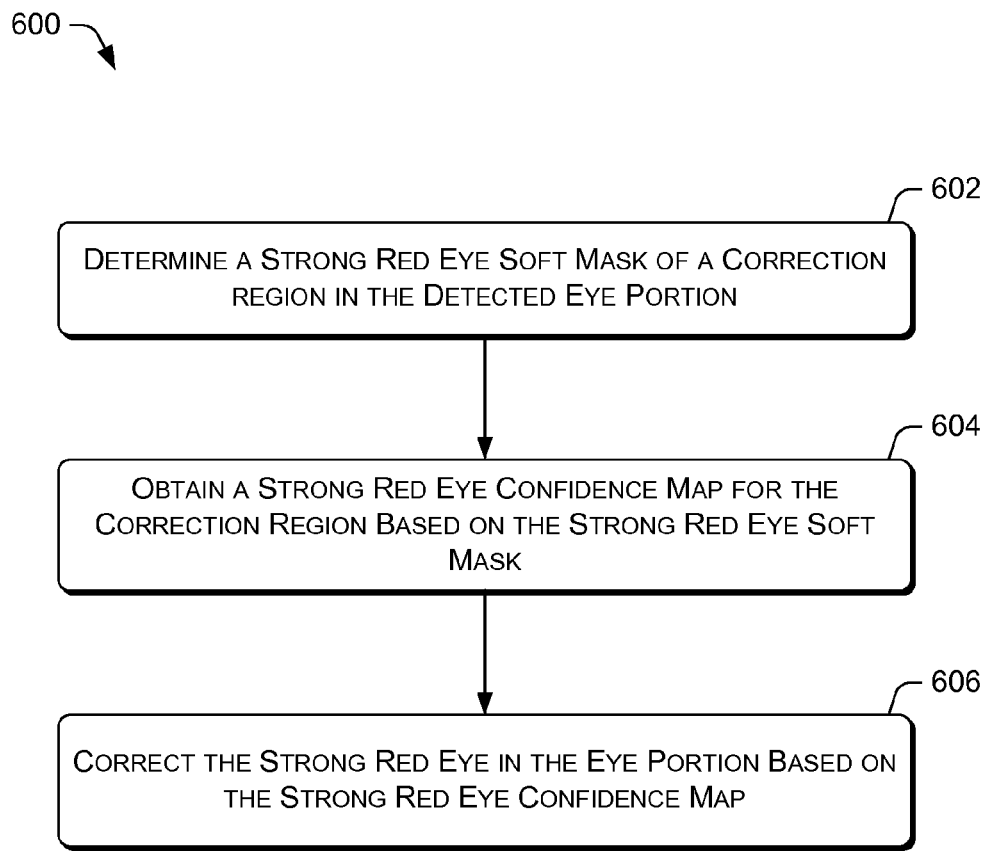
FIG. 6 is a flow diagram that illustrates an example process to correct a strong red eye in an eye portion of a digital image.

FIG. 6 is a flow diagram that illustrates an example process 600 to correct a strong red eye in an eye portion of a digital image. The example process 600 may further illustrate 406 of the example process 400.

At 602, the correction module 216 of the strong red eye correction component 106 may determine a strong red eye soft mask of a correction region (e.g. correction region 232) in the detected eye portion, such as the eye portion 228. In various embodiments, the strong red eye soft mask for the correction region may include a strong red eye area as well as additional surrounding weak-red pixels.

At 604, the correction module 216 may obtain a strong red eye confidence map for the correction region based on the strong red eye soft mask. In various embodiments, the correction module 216 may implement an edge preserving filter (e.g., a guided filter) to obtain a strong red eye confidence map from the strong red eye soft mask, which is then weighted by a distance to a center of the detected eye portion.

At 606, the correction module may correct the strong red eye in the detected eye portion using a correction algorithm that operates on the strong red eye confidence map. In at least one embodiment, the correction algorithm may be implemented using equation (4) and equation (5) described above, in which $C_{strong}$ is the strong red eye confidence map, I={G, B} and R, G, and B are the three color channels in the RGB color space. However, in other embodiments, the correction module 216 may use a similar correction algorithm with different values as long the desired correction of the redness in each pixel of the correction region is achieved.

Figure 7:
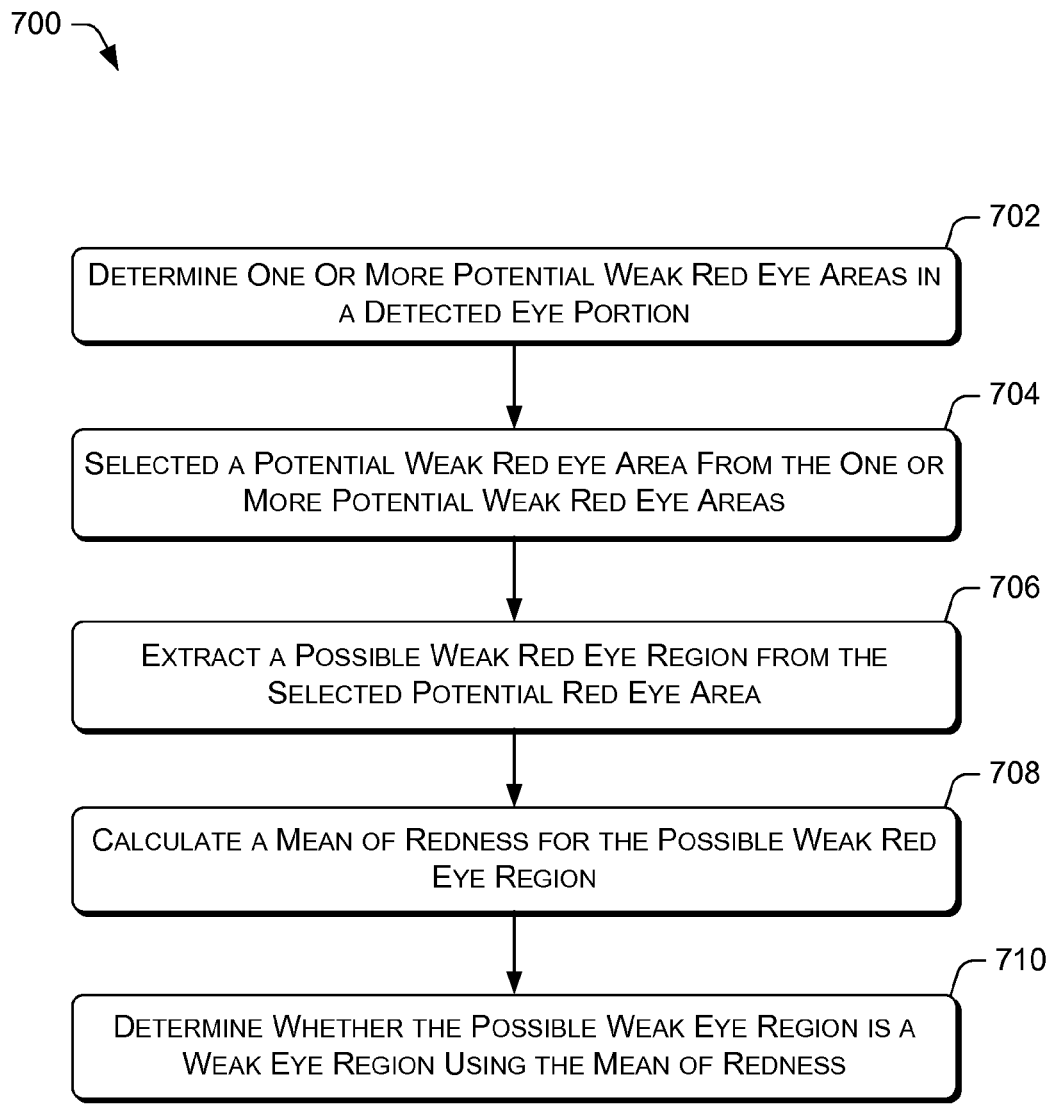
FIG. 7 is a flow diagram that illustrates an example process to determine whether an eye portion of a digital image includes a weak red eye or lacks a red eye.

FIG. 7 is a flow diagram that illustrates an example process 700 to determine whether an eye portion of a digital image includes a weak red eye or lacks a red eye. The example process 700 may further illustrate the decision 408 of the example process 400.

At 702, the detection module 218 of the weak red eye correction component 108 may receive a detected eye portion from the strong red eye correction component 106. The strong red eye correction component 106 may have rejected the detected eye portion as containing a strong red eye. The detection module 218 may determine one or more potential weak red eye areas. In various embodiments, the one or more potential weak red eye areas may be separated from a background of the detected eye portion by obtaining a first measure of redness for each pixel in the detected eye region and using a threshold-based segmentation.

At 704, the detection module 218 may select a potential weak red eye area from the one or more potential weak red eye areas. In various embodiments, the validation module 214 may select a potential weak red eye area that has the largest area and is closest to the center of the detected eye portion as a weak red eye maximum region. The detection module 218 may then estimate a central point and a radius for the weak red eye maximum region. Additionally, the detection module 218 may further obtain a second measure of redness for each pixel of the eye portion in the YCrCb color space.

At 706, the validation module 220 may extract a possible weak red eye region from the potential weak red eye area based on a set of empirical constraints. The set of empirical constraints may include (1) the possible weak red eye region is to lie in the weak red eye maximum region; (2) the distance from the possible weak red eye region to the central point is not to exceed the radius of the weak red eye maximum region; and (3) R/(R+G+B)>0.4 and (R+G+B)>0.2, in which R, G, and B are the three color channels in the RGB color space for the possible weak red eye region.

At 708, the validation module 220 may calculate a particular mean of redness for the possible weak red eye region. Based on this mean of redness, the validation module 220 may then obtain (1) a distance from the particular mean of redness to the mean of redness for a cluster of known weak red eye regions; and (2) a distance from the particular mean of redness to the mean of redness for a cluster of known non-red eye regions.

At 710, the validation module 220 may determine whether the possible weak red eye region is a weak red eye region or is in fact not a red eye region using the particular mean of redness. In various embodiments, if the distance from the particular mean of redness to the mean of redness for the cluster of known weak red eye regions is smaller than the distance from the particular mean of redness to the mean of redness for the cluster of known non-red eye region, then the validation module 220 may determine that the possible weak red eye region is indeed a weak red eye region. Thus, a weak red eye correction is to be performed for the eye portion.

Conversely, if the distance from the particular mean of redness to the mean of redness for the cluster of known weak red eye regions is larger than the distance from the particular mean of redness to the mean of redness for the cluster of known non-red eye region, then the validation module 220 may determine that the possible weak red eye region is actually not a red eye region. Thus, no weak red eye correction is to be performed for the eye portion.

Figure 8:
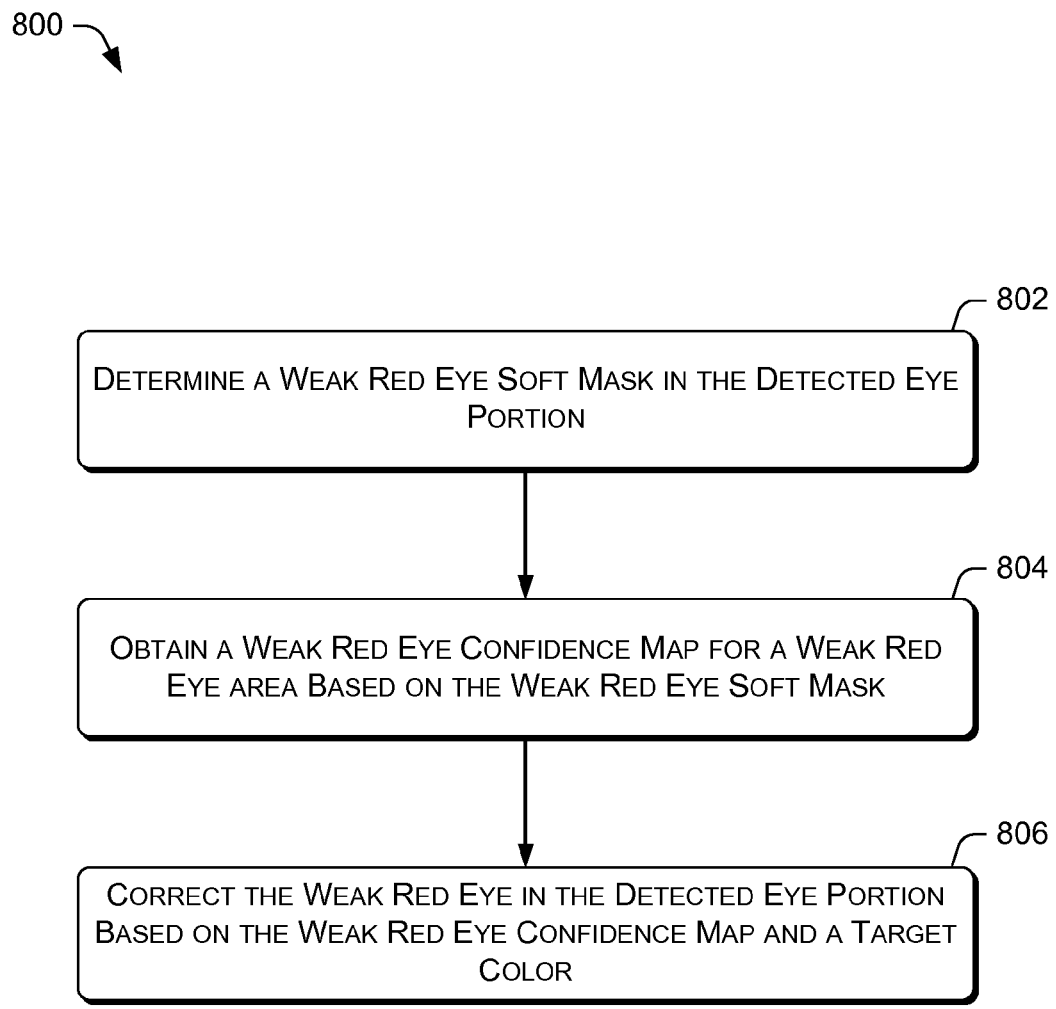
FIG. 8 is a flow diagram that illustrates an example process to correct a weak red eye in an eye portion of a digital image.

FIG. 8 is a flow diagram that illustrates an example process 800 to correct a weak red eye in an eye portion of a digital image. The example process 800 may further illustrate 410 of the example process 400.

At 802, the correction module 222 of the weak red eye correction component 108 may determine a weak red eye soft mask in the detected red eye portion. In various embodiments, the correction module 222 may use the second measure of redness described in the process 700 to obtain the soft mask by separating weak red eye pixels from background pixels.

At 804, the correction module 222 may obtain a weak red eye confidence map for a weak red eye area of the detected eye portion based on the soft mask. In various embodiments, the correction module 222 may use an edge-preserving filter (e.g., guided filter) to obtain the weak red eye confidence map, in which the red eye weak confidence map is further weighted by a distance to a center of the detected eye portion that encompasses the weak red eye area.

At 806, the correction module 222 may correct the weak red eye in the detected eye portion using the confidence map and a target color. In various embodiments of the correction algorithm, the correction module 222 may obtain the target color T by first converting a gray color that is derived from the RGB colors of weak red eye area, i.e., (G+B)/2 to the Lab color space and then multiply the L channel of the Lab color space by a factor, e.g., a factor of 0.8. The correction module 222 may then correct the color of the weak red eye area using the equation (8), in which $C_{weak}$ is the weak red eye confidence map, I={R, G, B}, T is the target color, and R, G, and B are the three color channels in the RGB color space. However, in other embodiments, the correction module 222 may use a similar algorithm with different values as long the desired correction of the redness in each pixel of the correction region is achieved.

The dual-phase approach to red eye correction as described herein may prevent overly aggressive red eye reduction that distort the appearance of the eyes in an digital image and overly conservative red eye reduction that fails to effective remove the red appearance of the eyes in the digital image.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-readable storage medium storing computer-executable instructions that, when executed, cause one or more processors to perform acts comprising:
   detecting an eye portion in a digital image;
   performing a strong red eye correction for the eye portion when the eye portion includes a strong red eye, the eye portion is determined to include the strong red eye when a redness hue of the eye portion is above a redness threshold, each of one or more shape values of a region inside a red eye area of the eye portion is greater than a corresponding roundness threshold, and the region inside the red eye area has a centrality value that is greater than a corresponding centrality threshold; and
   performing a weak red eye correction for the eye portion when the eye portion includes a weak red eye, the eye portion is determined to include the weak red eye portion at least when the redness hue of the eye portion is equal to or below the redness threshold.

2. The computer-readable storage medium of claim 1, wherein the detecting includes automatically separating the eye portion from a background of the digital image via object recognition or separating the eye portion from the background based at least on an estimation of interpupillary distance obtained from an manual input of eye locations in the digital image.

3. The computer-readable storage medium of claim 2, wherein the separating the eye portion includes separating the eye portion from a face region included in the digital image.

4. The computer-readable storage medium of claim 1, wherein the eye portion is determined to includes the weak red eye when the redness hue of the eye portion is equal to or below the redness threshold, and a redness mean of a region inside the eye portion is closer in distance to a redness mean of a cluster of known weak red eye regions than a redness mean of a cluster of non-red eye regions.

5. The computer-readable storage medium of claim 4, further comprising performing no red eye correction for the eye portion when the redness hue of the eye portion is equal to or below the redness threshold and a redness mean of the region inside the eye portion is closer in distance to the redness mean of the cluster of non-red eye regions than the redness mean of the cluster of known weak red eye regions.

6. The computer-readable storage medium of claim 1, wherein the performing the strong red eye correction includes:

determining a strong red eye soft mask for a correction region that is larger than a strong red eye area in the eye portion;

obtaining a strong red eye confidence map for the correction region based at least on the strong red eye soft mask; and correcting the strong red eye in the eye portion based at least on the strong red eye confidence map.

7. The computer-readable storage medium of claim 6, wherein the correcting the strong red eye includes correcting each pixel in the correction region using an algorithm that includes:

$$R' = (1 - C_{strong}) * R + C_{strong} * \min(G, B)$$

$$I' = (1 - 0.8 * C_{strong}) * I + 0.8 * C_{strong} * \min(G, B)$$

in which $C_{strong}$ is the strong red eye confidence map, $I = \{G, B\}$ and R, G, and B are three color channels in a RGB color space.

8. The computer-readable storage medium of claim 6, wherein the correction region includes additional reddish pixels from outside the strong red eye area.

9. The computer-readable storage medium of claim 1, wherein performing the weak red eye correction includes:

determining a weak red eye soft mask for the eye portion;

obtaining a weak red eye confidence map for a weak red eye area based at least on the weak red eye soft mask; and correcting the weak red eye in the eye portion based at least on the weak red eye confidence map and a target color.

10. The computer-readable storage medium of claim 9, wherein correcting the weak red eye includes correcting each pixel in the weak red eye area using an algorithm that includes:

$$I' = (1 - C_{weak}) * I + C_{weak} * T$$

in which $C_{weak}$ is the weak red eye confidence map, $I = \{R, G, B\}$, T is the target color, and R, G, and B are three color channels in an RGB color space.

11. The computer-readable storage medium of claim 9, wherein the target color is obtained by converting a gray color that is derived from the RGB colors of the weak red eye area to a Lab color space and multiplying an L channel of the Lab color space by a predetermined factor.

12. A computer-implemented method, comprising:

detecting an eye portion in a digital image;

performing a strong red eye correction on a red eye in the eye portion at least when a redness hue of the eye portion is above a redness threshold; and performing a weak red eye correction on the red eye when the redness hue of the eye portion is equal to or below the redness threshold, and a redness mean of a region inside the eye portion is closer in distance to a redness mean of a cluster of known weak red eye regions than a redness mean of a cluster of non-red eye regions.

13. The computer-implemented method of claim 12, further comprising performing no red eye correction on the red eye when the redness hue of the eye portion is equal to or below the redness threshold and a redness mean of the region inside the eye portion is closer in distance to the redness mean of the cluster of non-red eye regions than the redness mean of the cluster of known weak red eye regions.

14. The computer-implemented method of claim 12, further comprising:

determining one or more potential weak red eye areas in the eye portion;

selecting a potential weak red eye area that has a largest area and is closest to a center of the eye portion;

extracting the region from the selected potential weak red eye area; and calculating the redness mean for the region.

15. The computer-implemented method of claim 12, wherein the performing the strong red eye correction includes performing the strong red eye correction on the red eye when the redness hue of the eye portion is above a redness threshold, each of one or more shape values of an additional region inside a strong red eye area in the eye portion is greater than a corresponding roundness threshold, and the additional region inside the red eye area has a centrality value that is greater than a corresponding centrality threshold.

16. The computer-implemented method of claim 15, furthering comprising:

generating a redness probability map for the eye portion;

generating a binary mask that locates one or more candidate red eye areas based at least one the redness probability map; and selecting a candidate red eye area as the additional region.

17. A computing device, comprising:

one or more processors; and a memory that includes a plurality of computer-executable components, the plurality of computer-executable components comprising:

an eye locator module that detects an eye portion in a digital image based at least on an estimation of interpupillary distance obtained from a manual input of eye locations in the digital image;

a strong red eye correction component that performs a strong red eye correction for the eye portion when the eye portion includes a strong red eye; and a weak red eye correction component that performs a weak red eye correction for the eye portion when the eye portion includes a weak red eye that is at least distinguished from the strong red eye based on a redness threshold as having less redness hue than the strong red eye, and a redness mean of a region inside the eye portion is closer in distance to a redness mean of a cluster of known weak red eye regions than a redness mean of a cluster of non-red eye regions.

18. The computing device of claim 17, wherein the strong red eye correction component includes:

a detection module that selects a candidate red eye area from the eye portion;

a validation module that determines that the strong red eye is present when a hue of the eye portion is above the redness threshold, each of one or more shape values of a region inside the candidate red eye area is greater than a corresponding roundness threshold, and the region inside the candidate red eye area has a centrality value that is greater than a corresponding centrality threshold; and a correction module that corrects the strong red eye by determining a strong red eye soft mask for a correction region that is larger than the candidate red eye area, obtaining a strong red eye confidence map for the correction region based at least on the strong red eye soft mask, and correcting the strong red eye in the eye portion based at least on the strong red eye confidence map.

19. The computing device of claim 17, wherein the weak red eye correction component includes:

a detection module that selects a potential weak red eye area from one or more potential weak red eye areas in the eye portion;

a validation module that determines that the weak red eye is present when the redness hue of the eye portion is equal to or below the redness threshold, and a redness mean of a region inside the potential weak red eye area is closer in distance to a redness mean of a cluster of known weak red eye regions than a redness mean of a cluster of non-red eye region; and a correction module that corrects the weak red eye by determining a weak red eye soft mask for the eye portion, obtaining a weak red eye confidence map for a weak red eye area based at least on the weak red eye soft mask, and correcting the weak red eye in the eye portion based at least on the weak red eye confidence map and a target color.

* * * * *